Patented Sept. 13, 1927.

1,642,511

UNITED STATES PATENT OFFICE.

GEORGE E. SANDERS, OF DELORO, ONTARIO, CANADA, ASSIGNOR TO RICHES, PIVER & CO., A CORPORATION OF NEW JERSEY.

COPPER-ARSENIC DUST.

No Drawing. Original application filed December 23, 1920, Serial No. 432,692. Divided and this application filed August 9, 1924. Serial No. 731,203.

This application is a division of my co-pending application filed Dec. 23, 1920, Ser. No. 432,692 and now issued Patent No. 1,541,753 dated June 9, 1925.

The subject matter of this invention is a dry dusting powder, suitable for an insecticide or fungicide or both.

Arsenic is recognized as a basis for insecticides and copper, nickel, silver, zinc, aluminum, etc., as more or less effective fungicides. Dusting or the application of dry powdered insecticides and fungicides has many advantages over the applying of the same materials suspended in liquids.

White arsenic is the base from which many agricultural insecticides are made. The present methods of manufacturing arsenical insecticides suitable for use on foliage consist, for the most part, of numerous costly wet processes. The invention set forth in this application reduces the cost of manufacturing commercial dry, or powdered arsenical compounds from white arsenic.

My method of procedure is as follows:

I mix together ground quicklime, white arsenic and water. A very imperfect arsenite of lime is then formed by the reaction of the lime and arsenic in the presence of water. I use approximately equal parts of quicklime and white arsenic, but the proportions may be varied widely. I prefer to use ground quicklime, combined with arsenic, on account of its low cost and availability, but hydrated lime, ordinary quicklime, milk of lime and magnesium oxide, magnesium hydroxide, or various salts of barium, potassium, or sodium may be used instead of the lime and the same result achieved. That is, an arsenical salt that reacts with metallic salts such as copper sulphate to form a relatively insoluble metallic arsenite is produced.

Copper sulphate in the ordinary crystal form is then added to the mixture or arsenical salt described. I prefer to add an excess of copper sulphate or more than is required to completely react with the arsenical salt. The water added is varied according to the requirements of the finished product. For instance, if a product for potatoes is desired, the material at this stage would be a thick green paste. Other metallic salts of copper may be substituted or salts of aluminum, nickel, zinc, iron, cobalt and silver, etc., will serve.

I prefer to allow the paste or semi-liquid to stand for twenty-four hours in order to allow the metallic and the arsenical salts to chemically combine, but in many cases this is not essential.

I then add the paste or semi-liquid containing the metallic salt of arsenic to enough quicklime so that the lime in hydrating takes up all of the excess moisture and a dry powder results. The quicklime may be partially hydrated by adding water before adding the copper salt if high fungicidal value is desired. Either finely ground, crushed, or lump quicklime may be used. Magnesium or barium oxides may be substituted for the quicklime, but I prefer to use quicklime on account of its low cost, quick reaction and availability.

Artificial heat other than that produced by slaking lime may be used at any time to accelerate the process but it is not necessary to a successful or suitable final product. In certain cases the white arsenic may be mixed with the metallic salt, and the two added to the quicklime, either before or during the process of slaking, or the white arsenic may be added to the quicklime either before or after the metallic salt, or at the end of the process. The activity of the arsenic, both as regards safety and insecticidal value, may be thus varied as desired.

The process described and which I prefer to follow is mixing white arsenic, ground quicklime and water, using only sufficient water to hydrate the quicklime and form a paste, and the subsequent addition of copper sulphate crystals and the mixing of this mass with quicklime, which takes up the free water, resulting in the dehydration of the copper sulphate and the formation thereby of a powder suitable for dusting, thus avoiding the use of costly oxidizing processes.

More or less stirring during the process is necesssary and hydrators, dough mixers or troughs with either hand or mechanical stirrers may be used for the first, second and third operations. Numerous types of attrition, beater and grinding mills are suitable for the final grinding.

I prefer to have a small portion of the lime remain in the oxide form, as it causes the dust to keep longer without caking.

What I claim and desire to secure by Letters Patent is:—

1. A method for making a combined insecticide and fungicide in dry powder form, comprising first mixing together a soluble arsenic compound, lime and sufficient water to hydrate the lime and form a paste, adding a soluble metallic salt having fungicidal value thereto and then adding lime sufficiently in excess to take up all free water.

2. A method for making a combined insecticide and fungicide in dry powder form, comprising first mixing together white arsenic, lime and sufficient water to hydrate the lime and form a paste, adding a soluble metallic salt having fungicidal value thereto and then adding lime sufficiently in excess to take up all free water.

3. A method for making a combined insecticide and fungicide in dry powder form, comprising first mixing together a soluble arsenic compound, lime and sufficient water to hydrate the lime and form a paste, adding a soluble copper salt having fungicidal value thereto and then adding lime sufficiently in excess to take up all free water.

4. A method for making a combined insecticide and fungicide in dry powder form, comprising first mixing together a soluble arsenic compound, lime and sufficient water to hydrate the lime and form a paste, adding copper sulphate thereto and then adding lime sufficiently in excess to take up all free water.

5. A method for making a combined insecticide and fungicide in dry powder form, comprising first mixing together white arsenic, lime and sufficient water to hydrate the lime and form a paste, adding copper sulphate thereto and then adding lime sufficiently in excess to take up all free water.

6. A method of making a combined insecticide and fungicide in dry powder form, comprising first making calcium arsenite in paste form, reacting copper sulphate therewith, the copper salt being in excess of the amount required to completely react with the arsenical salt, and adding sufficient lime to take up all free water.

7. The method of forming a powdered insecticide and fungicide suitable for dusting, comprising reacting white arsenic with a copper salt having fungicidal value, in the presence of slacking lime then adding more lime thereto, the lime being in excess sufficient to take up all free water and produce the product in a dry powder form.

Signed at Medina in the county of Orleans and State of New York, this 6th day of August A. D. 1924.

GEORGE E. SANDERS.